(12) United States Patent
Ueberall

(10) Patent No.: US 6,976,508 B2
(45) Date of Patent: Dec. 20, 2005

(54) FLOW DIFFUSERS IN A UV PRESSURIZED REACTOR

(75) Inventor: Peter Ueberall, Uetersen (DE)

(73) Assignee: Trojan Technologies Inc., (CA)

( * ) Notice: Subject to any disclaimer, the term of this patent is extended or adjusted under 35 U.S.C. 154(b) by 0 days.

(21) Appl. No.: 10/195,313

(22) Filed: Jul. 16, 2002

(65) Prior Publication Data
US 2004/0011414 A1   Jan. 22, 2004

(51) Int. Cl.[7] ................................................ F15D 1/00
(52) U.S. Cl. .................. 138/39; 250/461.1; 250/504 R
(58) Field of Search .............................. 138/37, 39, 42; 250/461.1, 504 R

(56) References Cited

U.S. PATENT DOCUMENTS

|  |  |  |  |  |
|---|---|---|---|---|
| 527,680 A | * | 10/1894 | Gilchrist ........................ 138/37 |
| 2,567,998 A | * | 9/1951 | Griffith ......................... 138/42 |
| 3,134,655 A | * | 5/1964 | Boucher ........................ 138/37 |
| 3,831,350 A | * | 8/1974 | Gilles et al. ................... 138/37 |
| 3,871,624 A | * | 3/1975 | Huber et al. ................... 259/4 |
| 3,879,939 A | * | 4/1975 | Markowski ................... 138/39 |
| 4,058,141 A | * | 11/1977 | Hasinger et al. .............. 138/39 |
| 4,119,509 A | * | 10/1978 | Szoke ..................... 204/157.22 |
| 4,179,616 A | * | 12/1979 | Coviello et al. ............ 422/186.3 |
| 4,210,429 A | * | 7/1980 | Golstein ......................... 96/142 |
| 4,280,360 A | * | 7/1981 | Kobayashi et al. ............ 138/37 |
| 4,559,275 A | * | 12/1985 | Matt et al. ..................... 138/37 |
| 4,619,138 A | * | 10/1986 | Ohnhaus ........................ 138/37 |
| 4,786,812 A | * | 11/1988 | Humphreys ............ 250/455.11 |
| 5,313,375 A | * | 5/1994 | Jones ........................... 362/96 |
| 5,411,438 A | * | 5/1995 | White et al. .................. 138/39 |
| 5,422,488 A | * | 6/1995 | Baier et al. ............ 250/453.11 |
| 5,658,358 A | * | 8/1997 | Chyou et al. .................. 138/37 |
| 5,937,908 A | * | 8/1999 | Inoshiri et al. ................ 138/39 |
| 6,500,267 B1 | * | 12/2002 | Fencl et al. ..................... 134/1 |
| 6,627,000 B2 | * | 9/2003 | Fencl et al. ..................... 134/1 |
| 6,720,562 B2 | * | 4/2004 | Rathod et al. ............. 250/395 |
| 6,730,265 B2 | * | 5/2004 | Horton, III ................... 422/24 |

* cited by examiner

Primary Examiner—James Hook
(74) Attorney, Agent, or Firm—Katten Muchin Rosenman LLP

(57) ABSTRACT

A fluid treatment system is provided including a closed fluid treatment zone, at least one radiation source disposed in the fluid treatment zone to irradiate a flow of fluid, and a plurality of diffusers disposed upstream of the at least one radiation source. The plurality of diffusers define a decreasing gradient of fluid treatment zone cross-section from an upstream portion of the plurality of diffusers to a downstream portion of the plurality of diffusers. Also provided is a flat diffuser for changing flow cross section in a flow conduit.

22 Claims, 3 Drawing Sheets

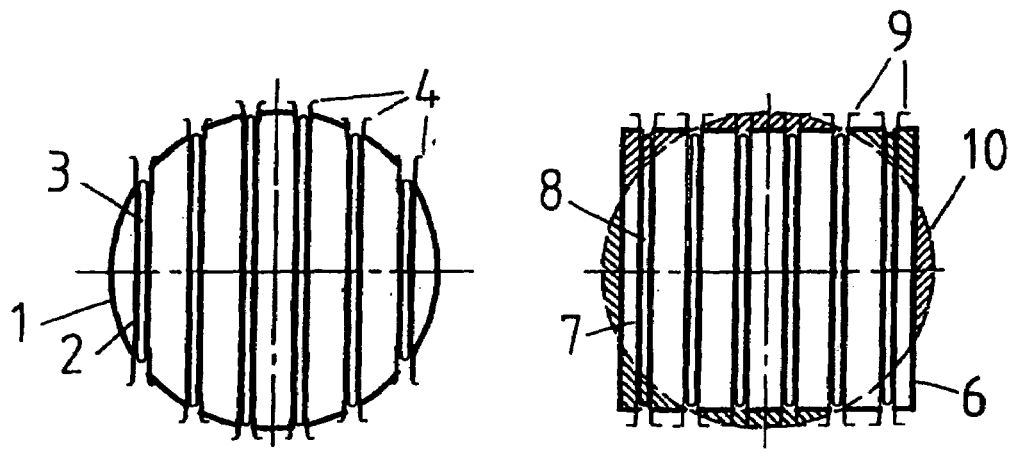
Fig.1
PRIOR ART
Fig.2
PRIOR ART
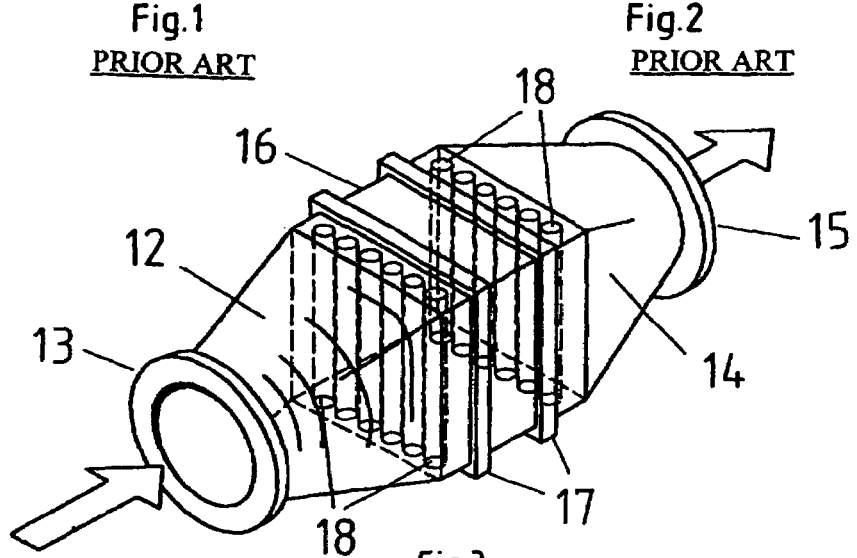
Fig.3
PRIOR ART
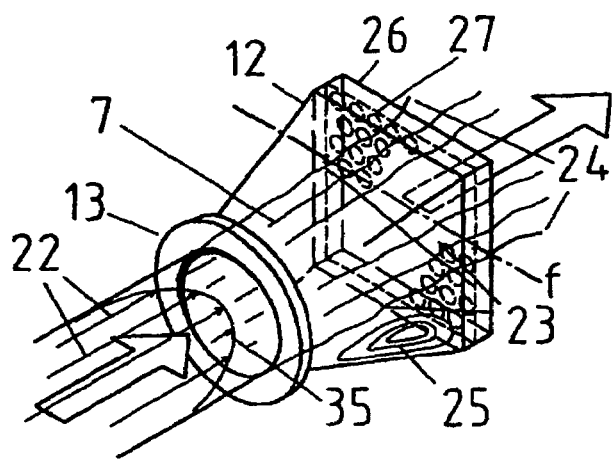
Fig.4
PRIOR ART

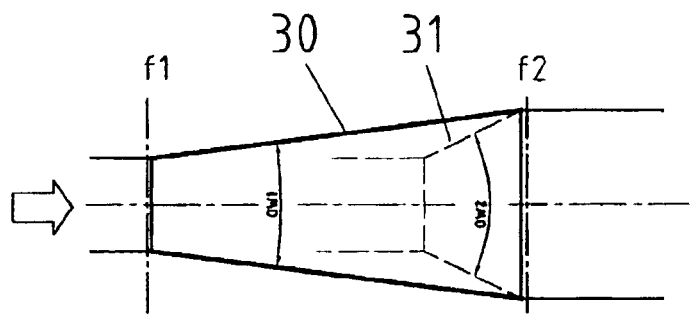
Fig.5a
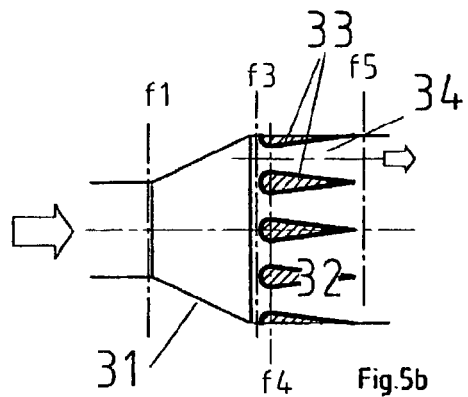
Fig.5b
Fig.5
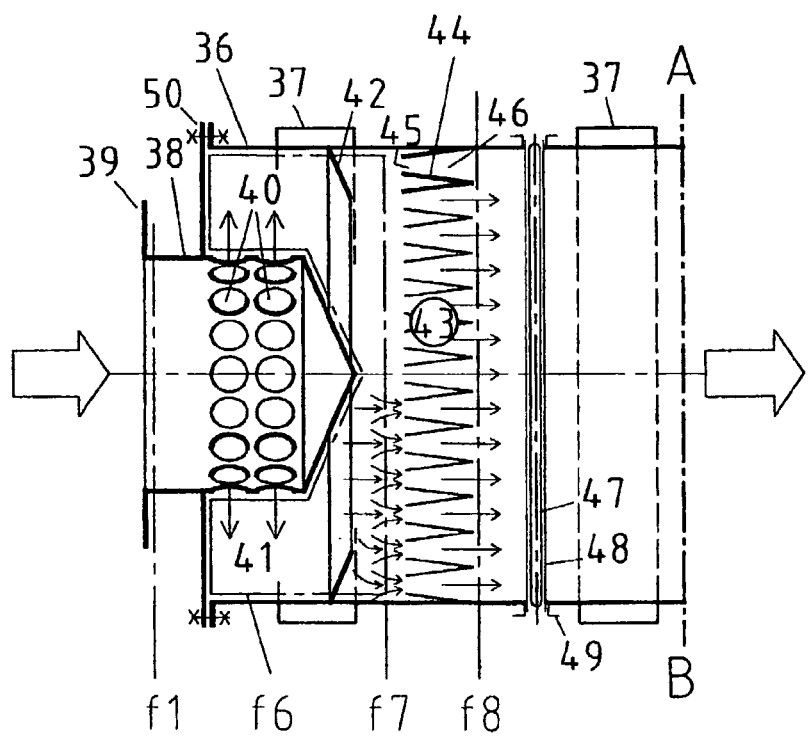
Fig.6

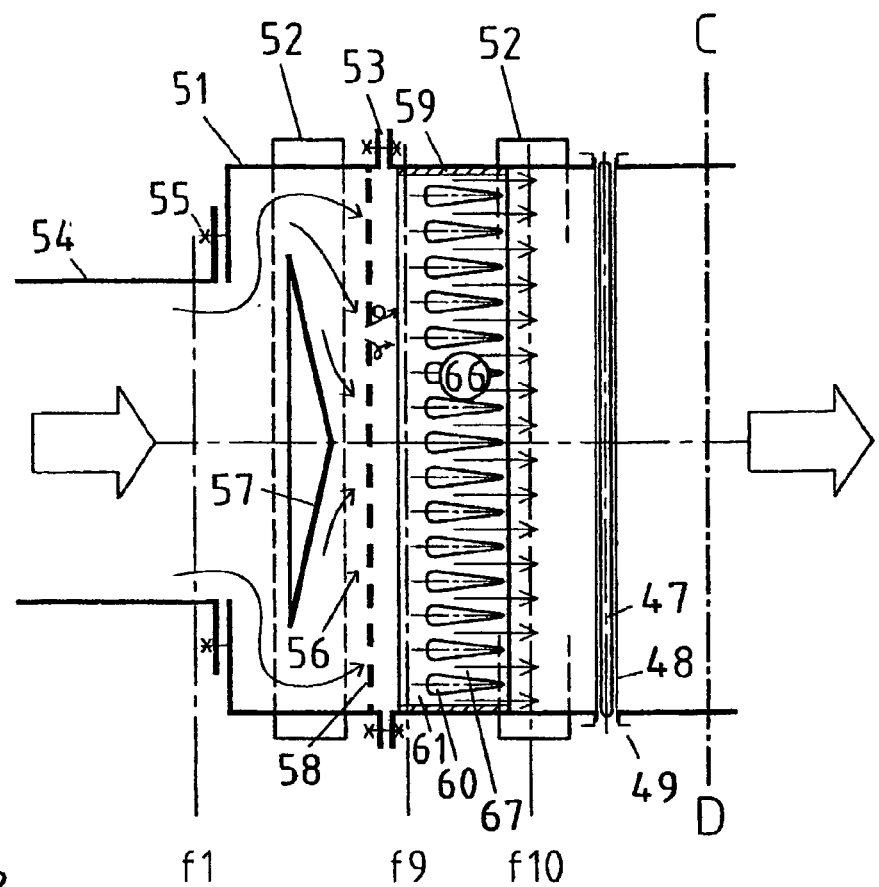
Fig. 7
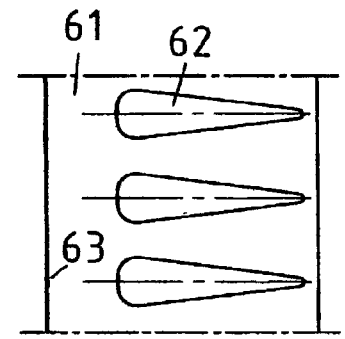
Fig. 8a
Fig. 8b
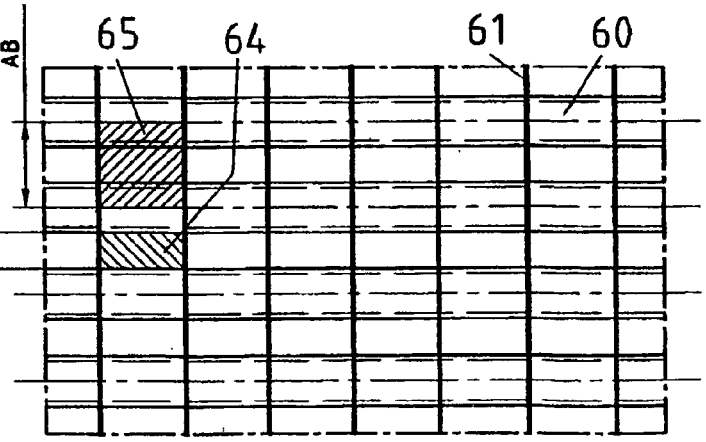
Fig. 8c    Fig. 8d
Fig. 8

FLOW DIFFUSERS IN A UV PRESSURIZED REACTOR

The invention relates to a flat diffuser for changing the flow cross section in a flow conduit, preferably for the inlet and outlet zone of UV disinfection chambers with a square or rectangular flow cross section. It is to be irrelevant whether an open or closed flow conduit is concerned, i.e. one that is enclosed by a housing, in which the flat diffuser is to shape or change a flow cross section or improve its hydraulic properties, or whether a closed flow conduit is concerned with a circular inlet cross section which is to be re-shaped after a short start-up section to a square or rectangular cross section.

FIG. 1 shows a cross section through a grid of UV radiators in a circular UV radiation chamber with a housing wall 1, with the quartz cladding tubes 2 in which the UV radiators 3 are to be built in and the radiator hatches 4 which allow a pressure-tight lead-out of the quartz cladding tubes. This design comes with the disadvantage that UV radiators of different length need to be used. The second disadvantage is that the radiator hatches 4 are not of the same length and, the farther away from the central axis, lead to long elliptical breakthroughs in the housing wall, as a result of which the position of the outermost radiators is limited at the distance from the central axis. In the case of a plurality of UV radiators in the cross section, such a construction leads to work-intensive welding work, despite being favorable from a flow viewpoint.

FIG. 2 shows the cross section through a grid of UV radiators in a radiation chamber with a square cross section with the housing wall 6, with the quartz cladding tubes 7 in which UV radiators 8 are to be built in and the radiator hatches 9. The square radiation chamber has advantages over the circular radiation chamber, namely the UV radiators of the same length and the straight bearing surface for the mounting and sealing of the radiator hatches. FIG. 2 shows the circular cross section 10 of FIG. 1 in the background. Both cross sections are of the same size. The missing and excess areas of the round cross section as compared with the square cross section are hatched and show the changes in cross section if one intends to change from the round cross section according to FIG. 1 to the square according to FIG. 2 and if the two cross sectional surface areas are to be of the same size. In this case the transition is not dramatic and could be "edge-formed" in a transitional pipe element. In this connection it also needs to be mentioned that a pressure vessel with a rectangular or square cross section requires thicker wall thicknesses and a circular frame which support the walls, so that no bulgings occur under pressure. A pressure vessel with a square cross section is therefore statically inferior as compared with the round pressure vessel conventionally used in boiler construction. Moreover, there is a completely different matter when the round inlet cross section is considerably smaller than the square one to which it needs to be extended in any way in the present case, as is shown in FIG. 3. In practice, however, one prefers a square cross section in UV devices of large flow throughput and takes the disadvantages into account.

One example according to the state of the art is shown schematically in FIG. 3. In principle, the currently largest UV disinfection chambers are built in this manner. The devices have an inlet and outlet flange 13, 15 with a round cross section for flanging onto the inflow and outflow piping. For the transition to the intended square cross section for housing the UV radiator grid there are two cushion-shaped transition pieces, an inlet "diffuser" 12 and an outlet "diffuser" 14. Expansion or tapering elements of this kind are difficult to manufacture as compared with reducers with round connections at both sides. For cost and space reasons these parts are kept as short as possible, which again demands special measures in the interior in order to transfer the flow in a more or less clean way and without major hydraulic losses from the round to the square cross section. One usually overcomes this problem with flow screens, which are perforated plates over the entire cross section and baffle or deflection plates, i.e. installed baffles. In FIG. 3, the reference numeral 16 is the radiation chamber, reference numeral 17 the necessary reinforcing frame for avoiding bulgings under pressure and reference numeral 18 an indication of the arrangement of a UV radiator grid transversally to the flow.

FIG. 4 shows the inlet element 12 of FIG. 3 without any further baffles with the connecting flange 13, the square outlet cross section 26, the inflowing water flow 22, its continuation 23 in the transition element and the outgoing water flow 24 with its limitation. Without any further guide elements the water flow will "shoot through" the short transition element, break away from the walls and form dead eddy zones 25. The shorter the expansion element 12, the more unorganized the hydraulic conditions will become in the interior and the more useless for the aforementioned purposes they will be. The flow 22 from the incoming tube will not intend to distribute itself in an evenly laminar manner over the square cross section 26. Reference numeral 27 is a flow screen, of which one generally expects that an incoming expanding flow of a certain shape will evenly distribute to the new larger, possibly still square cross section. One could think that an excessively large flow speed at a pass-through hold will lead to a larger flow resistance and the flow is thus prevented, whereas the other holes will allow slightly more to pass. This will fail on the one hand due to the fact that in the control surface "f", i.e. in the cross section slightly before the flow screen in the arrangement according to FIG. 4, certainly no uniform pressure prevails, and on the other hand that in the flow of round delimitation coming from the tube there is a speed profile 35 which in the longitudinal axis of the pipe may show under certain circumstances a considerably higher speed and in the middle region of the flow screen the water will impinge more rapidly and that as a result more water will flow through the flow screen in this region than in the edge of the same. One must consider further that such a speed profile will only build up in a longer straight piece of the tube and a separation-free flow expansion in a transition element similar to FIG. 4, as are actually used in UV devices of high performance, can only be expected in far smaller opening angles of about 15°. Apart from the fact that such a cushion-shaped transition element cannot be produced easily, it is not only unfavorable from a hydraulic viewpoint, but also for reasons of complex and expensive production. If the transition from a round to a larger angular cross section is to be achieved in a somewhat clean manner from a hydraulic viewpoint, it is necessary to provide in said transition element a number of additional installed elements such as baffle plates for example. It is necessary to consider that hydraulic inconsistencies, i.e. imprecise flow distribution in the square cross section in which the UV radiator grids are disposed can only be compensated with higher reserve capacity in the bactericidal range of the UV radiators.

Exemplary embodiments of the present invention will now be described with reference to the accompanying drawings, wherein like reference numerals denote like parts, and in which:

FIGS. 1 and 2 both illustrate a sectional view of a prior art fluid irradiation zone.

FIGS. 3 and 4 each illustrate a perspective view of a prior art fluid treatment system.

FIGS. 5a and 5b illustrate sectional views of a first embodiment of the present fluid treatment system.

FIG. 6 illustrates a sectional view of a second embodiment of the present fluid treatment system.

FIG. 7 illustrates a sectional view of a third embodiment of the present fluid treatment system.

FIGS. 8a, 8b, 8c and 8d illustrate sectional views of diffuser elements used in the fluid treatment system illustrated in FIG. 7.

The flat diffuser according to the inventive idea that is especially suitable in the rectangular or square cross section is a solution to this quandary. According to the simple teachings of the invention one arranges a number of smaller "diffusers", namely divergent rectangular channels, which are distributed over the flow cross section, which can be the inflow cross section of a UV disinfection device, instead of changing the cross section, e.g. from a circular tube connection to a square and larger cross section by means of a single diffuser (shaped tube expansion element).

FIG. 5 shows the simple principle.

According to FIG. 5a, a round cross section f1 is to be expanded to a similarly round cross section f2. Usually, the diffuser 30 will be formed with a smaller opening angle OW1 of which one knows that it will work without any flow separation and with only a small level of loss. The matter is completely different in a strongly reduced expansion element 31 with the considerably larger opening angle OW2. Within the control surface f2 there are strong eddy currents which are useless in a downstream UV radiator grid. In UV devices one only strives towards a so-called "plug flow" (piston flow) with a limited radial and even inherent turbulence.

FIG. 5b shows how a flat diffuser according to the inventive idea which is disposed between f3 and f5 and with the use of a short reducer 31 and even the transition from a round cross section f1 to a square one from control surface f3 still leads to an even distribution of the flow over the entire flow cross section between f3 and f5. The flat diffuser shall consist of profile bars 33 which are arranged in such a way that a single diffuser 34 is formed between two ribs each, which diffuser, although very much shorter in the flow direction than a normally long expansion diffuser, can have a smaller expansion angle and be geometrically similar to diffuser 30 in FIG. 5a. A uniform pressure is assumed over the entire cross section in the control surface f3, whereupon an equal quantity of fluid flows through all individual diffusers 34 and it is also assumed that there is no overly strong irradiation of the center of the flat diffuser. There is no need to mention specifically that the arrangement according to FIG. 5b cannot yet lead to the actual goal. FIG. 5b is only intended to show the simple inventive idea, namely the arrangement of short individual diffusers which are distributed in a compound way over the entire cross section and have a small opening angle, instead of a single expansion diffuser for the entire flow cross section as with reference numeral 30 in FIG. 5a. The diffusers in the rectangular cross section from f3 are rather "splits" and not individual diffusers within the terms of expanding divergent individual tubes of square cross section. They certainly have a longitudinal rectangular cross section and by incorporating perpendicular thin walls (61 in FIG. 8) such as strips of sheet metal it is easy to produce "single channels" or at least narrower rectangular single diffusers. The flat diffuser is distinguished here substantially from perforated plates or flow "grids" of any kind because they lack the divergent expansion possibility due to the low material thickness in the flow direction and the angle of attack is 0° in grids of sheet metal strips. Moreover, the desired radial turbulence can also be produced by the shortening of the single diffusers and a thus ensuing slight flow separation. Notice should also be taken that in the arrangement according to FIG. 5b the flow is expanded practically twice. At first roughly from f1 to f3, with the round cross section being re-shaped to the square cross section; at f4 there is a constriction and a renewed expansion under a favorable expansion angle and at f5 the even distribution towards the entire following surface. Interesting is also the arrangement of two flat diffusers which are mutually offset by 90° with respect to one another. A short upstream transition element 31 according to FIG. 5b without any further installed parts should be sufficient in the case of flow speeds that are not excessively high.

APPLICATION EXAMPLE 1

Inlet into a UV disinfection device with a square cross section of the radiation chamber according to FIG. 1.

In FIG. 6, reference numeral 36 is the housing made of special steel of a UV device of a square cross section with the reinforcing frame 37 and an inlet tube 38 with the connecting flange 39 and two rows of peripheral inlet bores 40 which lead to a pre-chamber 41 with a baffle plate frame 42 within the control surfaces f6. Reference numeral 43 is a flat diffuser according to the inventive idea, composed of peaked canted strips of sheet metal 44 with the inlet slots 45, from which the short rectangular single diffusers 46 of housing width are formed. The flat diffuser 43 is to be disposed between the control surfaces f7 and f8. Downstream there is the first UV radiator grid, consisting of a grid-like row of UV radiators 47 over the entire flow cross section, inserted in a presswater-tight manner into the UV radiator cladding tube 48 with the radiator hatches 49. In contrast to the arrangement according to FIG. 5b, the apparatus according to FIG. 6, which is shown as an example, comprises both measures for avoiding the impingement of inlet water ejecting from the inlet tube 38 as well as measures for producing a substantially uniform turbulent water zone before the control surface f7 with the purpose of producing a substantially uniform pressure in the outflow cross section f7 from the control chamber f6 so that certain inlet slots of the flat diffuser do not let through considerably more water than the other ones. Accordingly, there is also no flow profile. The inlet slots 45 could be blown against in the middle and would also have to be expected behind the flat diffuser in the control surface f8. A compensation will be produced in this manner in the pre-chamber 41. The housing 36 is further provided at the front side with a lid with the connecting flange 50. Installed parts such as the baffle plate frame 42 and the flat diffuser 43 will thus become accessible and can be better installed and disassembled. In this example the line of intersection A-B divides the device in the middle, whereby the arrangement to the left of the line of intersection A-B must be imagined in a mirrored way on the right side. Notice must be taken principally that the arrangement of the inlet zone before the flat diffuser, i.e. the actual subject matter of the invention, must be left to the designer's craftsmanship. There are a large number of possibilities to create the required hydraulic conditions there.

APPLICATION EXAMPLE 2

Inlet into a UV disinfection device with a square cross section of the radiation chamber according to FIG. 7 and FIG. 8.

In FIG. 7, reference numeral 51 relates to the housing of a UV device made of special steel with a square cross section with the reinforcing frame 52 and a flange connection on which the incoming pipe 54 can be screwed on directly by means of stud bolts 55. The housing 51 is provided with a prechamber 56 with the baffle plate 57 and a flow screen 58. Baffle plate and flow screen are to influence the water inflow in such a way that a flow broken into small turbulences can be expected behind the flow screen 58 with approximately even pressure over the control surface f9. Reference numeral 66 relates to a flat diffuser according to the inventive idea in an installation frame 59 made of special steel, with profile bars 60, made in the extruder according to FIG. 8b in a continuous manner from UV-resistant polyethylene (PE) by injection with separating walls 61 made of special steel plate through which they are pushed and thus form a fixed grid-like element. The individual diffusers 67 are thus formed between the profile bars 60. The water flowing off from the flat diffuser then meets a first UV radiator grid transversally to the flow, consisting of UV radiators 47 which are inserted into quartz cladding tubes 48 with hatch elements 49 for hermetically sealing the cladding tube to the outside. FIG. 8 shows the flat diffuser represented in the application example 2 in closer detail, with FIG. 8d showing the representation according to FIG. 8c in the direction "E". In FIG. 8c, the reference numeral 60 relates to the diffuser elements, 61 to one of the provided separating walls with the front edge 63 which stands against the flow before the flat diffuser. The front edge on the separating walls 61 can be helpful through the substantial elimination of any transversal flows that may still exist before the control surface f9 and through the production of the even pressure over f9. The separating plates 61 are provided here by way of example according to FIG. 8a with lasered recesses 62 through which the elements 60 are simply pushed. The separating walls per se are to be fastened at a suitable distance in frame 59 of the flat diffuser. FIG. 8d shows in a sectional view the diffuser elements 60, the separating walls 61, the entrance surface 64 into the single diffuser and the larger exit surface 65 whose sum total corresponds in this example to the cross section in f10 in the UV radiation chamber. In order to keep down the flow resistance, the diffuser elements 60 are rounded off at the front side. The housing 51 should be capable of being opened by means of a flange connection 53 so as to make the installed parts 57, 58 and 66 accessible and to allow their installation. The designer will have to decide on the number of the individual elements 60, the separating plates 61 and their distance and the smoothing flow measures upstream of the flat diffuser. The optimal arrangement can be found and checked empirically.

What is claimed is:

1. A fluid treatment system comprising:
    a closed fluid treatment zone;
    at least one radiation source disposed within the closed fluid treatment zone to irradiate a flow of fluid; and
    a plurality of diffusers disposed upstream of the at least one radiation source, the plurality of diffusers defining an increasing gradient of fluid treatment zone cross-sectional from an upstream portion of the plurality of diffusers to a downstream portion of the plurality of diffusers, wherein each diffuser comprises a pair of plate elements having a random angle of attack with respect to a direction of fluid flow through the fluid treatment zone.

2. The fluid treatment system defined in claim 1, wherein each diffuser comprises an elongate body having a longitudinal axis disposed transverse to a direction of fluid flow through the fluid treatment zone.

3. The fluid treatment system defined in claim 1, wherein each diffuser comprises an elongate body having a longitudinal axis disposed substantially perpendicular to a direction of fluid flow through the fluid treatment zone.

4. The fluid treatment system defined in claim 1, wherein each diffuser has a cross-section substantially in the shape of an aerofoil.

5. The fluid treatment system defined in claim 1, wherein the plurality of diffusers are disposed in a substantially side-by-side arrangement.

6. The fluid treatment system defined in claim 1, wherein each upstream end of each diffuser is in a common plane disposed substantially orthogonal to a direction of fluid flow through the fluid treatment zone.

7. The fluid treatment system defined in claim 1, further comprising a closed transition region upstream of the plurality of diffusers.

8. The fluid treatment system defined in claim 7, wherein the transition region and the fluid treatment zone have a different cross-sectional shape.

9. The fluid treatment system defined in claim 7, wherein the transition region comprises a round cross-sectional shape and the fluid treatment zone comprises a rectangular cross-sectional shape.

10. The fluid treatment system defined in claim 1, wherein the plurality of diffusers is disposed in the fluid treatment zone.

11. The fluid treatment system defined in claim 1, wherein the plurality of diffusers is disposed on a common mounting frame.

12. The fluid treatment system defined in claim 1, further comprising a closed transition region downstream of the plurality of diffusers.

13. The fluid treatment system defined in claim 1, wherein the plurality of diffusers comprises a first set of diffusers and a second set of diffusers disposed downstream of the first set of diffusers.

14. The fluid treatment system defined in claim 1, wherein the fluid treatment zone comprises a plurality of radiation sources.

15. The fluid treatment system defined in claim 1, wherein the fluid treatment zone comprises a plurality of ultraviolet radiation sources.

16. The fluid treatment system defined in claim 1, wherein the at least one radiation source is elongate and has a longitudinal axis disposed transverse to a direction fluid flow through the fluid treatment zone.

17. The fluid treatment system defined in claim 1, wherein the at least one radiation source is elongate and has a longitudinal axis substantially perpendicular to a direction fluid flow through the fluid treatment zone.

18. A fluid treatment system comprising:
    a closed fluid treatment zone;
    at least one radiation source disposed within the closed fluid treatment zone to irradiate a flow of fluid; and
    a plurality of diffusers disposed upstream of the at least one radiation source, the plurality of diffusers defining an increasing gradient of fluid treatment zone cross-sectional from an upstream portion of the plurality of diffusers to a downstream portion of the plurality of diffusers, wherein each diffuser comprises a pair of edged plate elements which are arranged mutually parallel and each form two limiting surfaces with respect to an adjacent diffuser.

19. A fluid treatment system comprising:

a closed fluid treatment zone;

at least one radiation source disposed within the closed fluid treatment zone to irradiate a flow of fluid; and a plurality of diffusers disposed upstream of the at least one radiation source, the plurality of diffusers defining an increasing gradient of fluid treatment zone cross-sectional from an upstream portion of the plurality of diffusers to a downstream portion of the plurality of diffusers, wherein a closed transition region transition region upstream of the plurality of diffusers comprises an increasing cross-section in a direction toward the plurality of diffusers.

20. A fluid treatment system comprising:

a closed fluid treatment zone;

at least one radiation source disposed within the closed fluid treatment zone to irradiate a flow of fluid; and a plurality of diffusers disposed upstream of the at least one radiation source, the plurality of diffusers defining an increasing gradient of fluid treatment zone cross-sectional from an upstream portion of the plurality of diffusers to a downstream portion of the plurality of diffusers, wherein the transition region comprises an increasing cross-section in a direction toward the plurality of diffusers.

21. A water treatment system comprising:

a closed fluid treatment zone;

at least one radiation source disposed in the fluid treatment zone to irradiate a flow of fluid;

a plurality of diffusers disposed upstream of the at least one radiation source, the plurality of diffusers defining an increasing gradient of fluid treatment zone cross-sectional area from an upstream portion of the plurality of diffusers to a downstream portion of the plurality of diffusers, each diffuser being substantially symmetrical about an axis substantially parallel to a direction flow of fluid; and wherein each of the plurality of diffusers has: (i) a longitudinal axis substantially parallel to a direction of the flow of fluid through the fluid treatment zone and (ii) a tapered cross-section along at least a portion of the longitudinal axis.

22. A water treatment system comprising:

a closed water treatment zone;

at least one ultraviolet radiation source disposed in the water treatment zone to irradiate a flow of water through the water treatment zone; and a plurality of elongate diffusers disposed upstream of the at least one ultraviolet radiation source, the plurality of elongate diffusers defining an increasing gradient of water treatment zone cross-sectional area from an upstream portion of the plurality of elongate diffusers to a downstream portion of the plurality of elongate diffusers;

wherein each elongate diffuser has: (i) a longitudinal axis substantially parallel to a direction of the flow of water through the water treatment zone and (ii) a tapered cross-section along at least a portion of the longitudinal axis.

* * * * *